Patented June 7, 1932

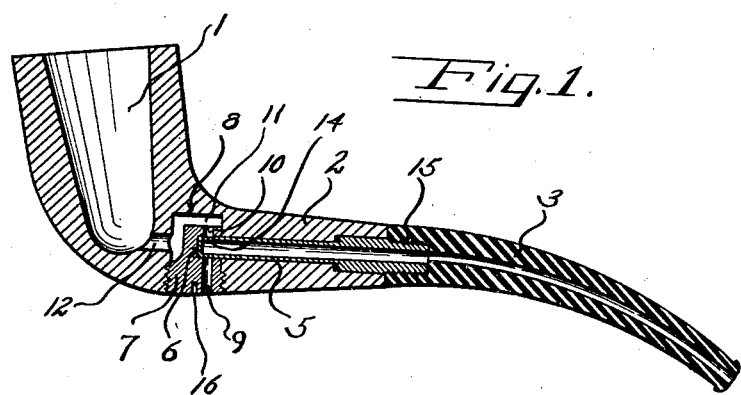
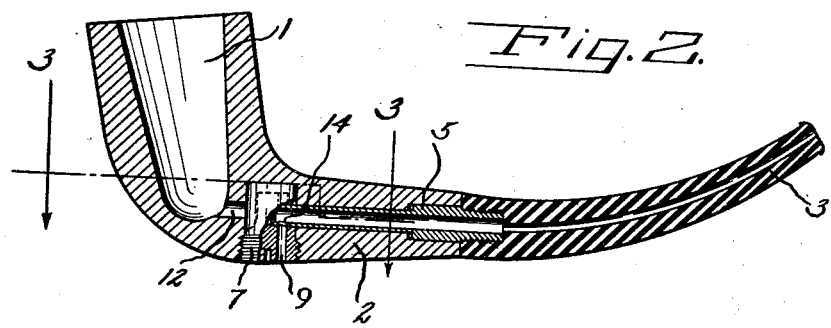
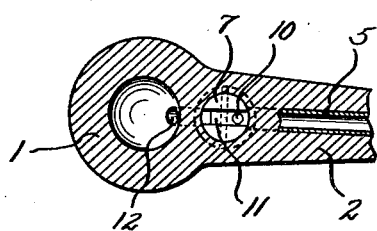

1,861,503

UNITED STATES PATENT OFFICE

CHARLES EDGAR MAYNARD, OF NORTHAMPTON, MASSACHUSETTS

SMOKING PIPE

Application filed December 7, 1929. Serial No. 412,351.

My invention relates to smoking pipes and more particularly to a pipe having improved means for keeping the stem and bowl thereof free of foreign matter. Other and further objects will be apparent from the following specification and claim.

In the accompanying drawing which illustrates one embodiment of my invention,

Fig. 1 is a longitudinal section of a pipe made according to my invention and with the parts in normal smoking position;

Fig. 2 is a similar section but with the parts in position for removing foreign matter from the stem; and Fig. 3 is a section substantially on line 3—3 of Fig. 2.

Referring to the drawing, 1 designates the bowl of the pipe, 2 the shank of the bowl and 3 the mouthpiece. The mouthpiece is provided with a stem 5 the outer end of which engages in a recess 6 formed in a cylindrical plug 7 which is threaded into a cylindrical recess 8 adjacent the base of the bowl. The recess 6 in which the end of the stem 5 engages is provided with a passage 9 extending to the outside face of plug 7 and a passage 10 connecting with a duct 11 formed in plug 7 and connecting in turn with a passage 12 to the bowl of the pipe. The stem 5 may or may not be closed at the end but is provided with an aperture 14 which, when the stem and mouthpiece are in normal smoking position as shown in Fig. 1, registers with passage 10 in plug 7 to form a continuous smoke passage from the bowl of the pipe to the mouthpiece. The stem 5 is secured to the mouthpiece 3 as by threads 15 so that the stem 5 will turn with the mouthpiece 3. When the stem 5 and mouthpiece 3 become fouled with moisture or foreign matter it is only necessary to turn the mouthpiece 3 and with it the stem 5 through an angle of 180° to position the parts as shown in Fig. 2, i. e., with aperture 14 registering with passage 9 in which position the matter which has collected in the stem 5 and mouthpiece 3 may be blown out through passage 9. For general cleaning the plug 7 may be removed, the mouthpiece 3 and stem 5 having been first withdrawn, and to facilitate this removal of the plug 7 I provided the latter with a slot 16 in which a knife blade or the edge of a coin or the like may be engaged to remove plug 7 from the pipe. As shown, the passage 8 functions due to its shape as a trap preventing the passage of tobacco and ashes to the stem 5.

It will be seen that from my construction I provide means for quickly freeing the stem and mouthpiece of the pipe from foreign matter without the use of the ordinary pipe cleaning devices and without danger of blowing such foreign matter into the bowl of the pipe.

Having described one embodiment of my invention, I claim:

A smoking pipe having a bowl provided on its under side with a recess and having a passage connecting the recess with the bowl, a movable mouthpiece, a plug removably positioned in said recess, said plug being provided with a duct registering with the passage to the bowl and with a duct leading to the outside of the plug, a stem carried by the mouthpiece and adapted to be selectively connected directly with the duct leading to the bowl or with the duct leading to the outside of the plug upon rotation of the mouthpiece.

CHARLES EDGAR MAYNARD.